US009339946B2

(12) United States Patent
Vogt et al.

(10) Patent No.: US 9,339,946 B2
(45) Date of Patent: May 17, 2016

(54) DEVICE FOR MIXING BONE CEMENT AND METHOD FOR MIXING BONE CEMENT AND USE OF THE DEVICE

(71) Applicant: Heraeus Medical GmbH, Wehrheim (DE)

(72) Inventors: Sebastian Vogt, Erfurt (DE); Tim Schnieber, Frankfurt (DE)

(73) Assignee: Heraeus Medical GmbH, Wehrheim (DE)

( * ) Notice: Subject to any disclaimer, the term of this patent is extended or adjusted under 35 U.S.C. 154(b) by 143 days.

(21) Appl. No.: 13/679,428

(22) Filed: Nov. 16, 2012

(65) Prior Publication Data

US 2013/0135957 A1 May 30, 2013

(30) Foreign Application Priority Data

Nov. 25, 2011 (DE) .......................... 10 2011 119 371

(51) Int. Cl.
 *B29B 7/12* (2006.01)
 *B01F 11/00* (2006.01)
 *B01F 13/00* (2006.01)
 *B01F 15/00* (2006.01)

(52) U.S. Cl.
 CPC ............... *B29B 7/12* (2013.01); *B01F 11/0054* (2013.01); *B01F 13/003* (2013.01); *B01F 15/00525* (2013.01); *B01F 2215/0029* (2013.01)

(58) Field of Classification Search
 CPC ........... B01F 2215/0029; F15B 15/149; F15B 15/204; B29B 7/12

USPC ............ 366/139, 189, 333; 91/422; 92/181 P, 92/181 R
See application file for complete search history.

(56) References Cited

U.S. PATENT DOCUMENTS

| 1,299,668 | A | * | 4/1919 | Blomquist | ...................... 91/401 |
| 2,308,837 | A | * | 1/1943 | Smith | ........................... 604/314 |
| 2,462,580 | A | * | 2/1949 | Watson | ............................. 91/365 |
| 3,173,341 | A | * | 3/1965 | Carpenter | ...................... 91/401 |

(Continued)

FOREIGN PATENT DOCUMENTS

| CA | 2708729 A1 | 1/2011 |
| DE | 3 640 279 A1 | 6/1987 |

(Continued)

OTHER PUBLICATIONS

Australian Examination Report for corresponding Australian Patent Application No. 2012254869 dated Oct. 14, 2013.

(Continued)

*Primary Examiner* — David Sorkin
*Assistant Examiner* — Abbas Rashid
(74) *Attorney, Agent, or Firm* — Norris McLaughlin & Marcus, P.A.

(57) ABSTRACT

A device automatically mixes bone cement and has two separate plunger space sections with a gas feed and a gas outlet, which are separated from each other through a plunger. A blocking organ is provided in the plunger and can be switched at the turnaround points of the plunger path. Suitable connecting facilities connect the plunger to a mixing facility that is arranged in a mixing vessel. Alternating build-up of a pressure difference and pressure equalization in both plunger space sections causes the plunger to move up and down. The plunger motion effects a simultaneous up-and-down motion and rotation of the mixing facility.

13 Claims, 2 Drawing Sheets

(56) References Cited

U.S. PATENT DOCUMENTS

Figure 1:
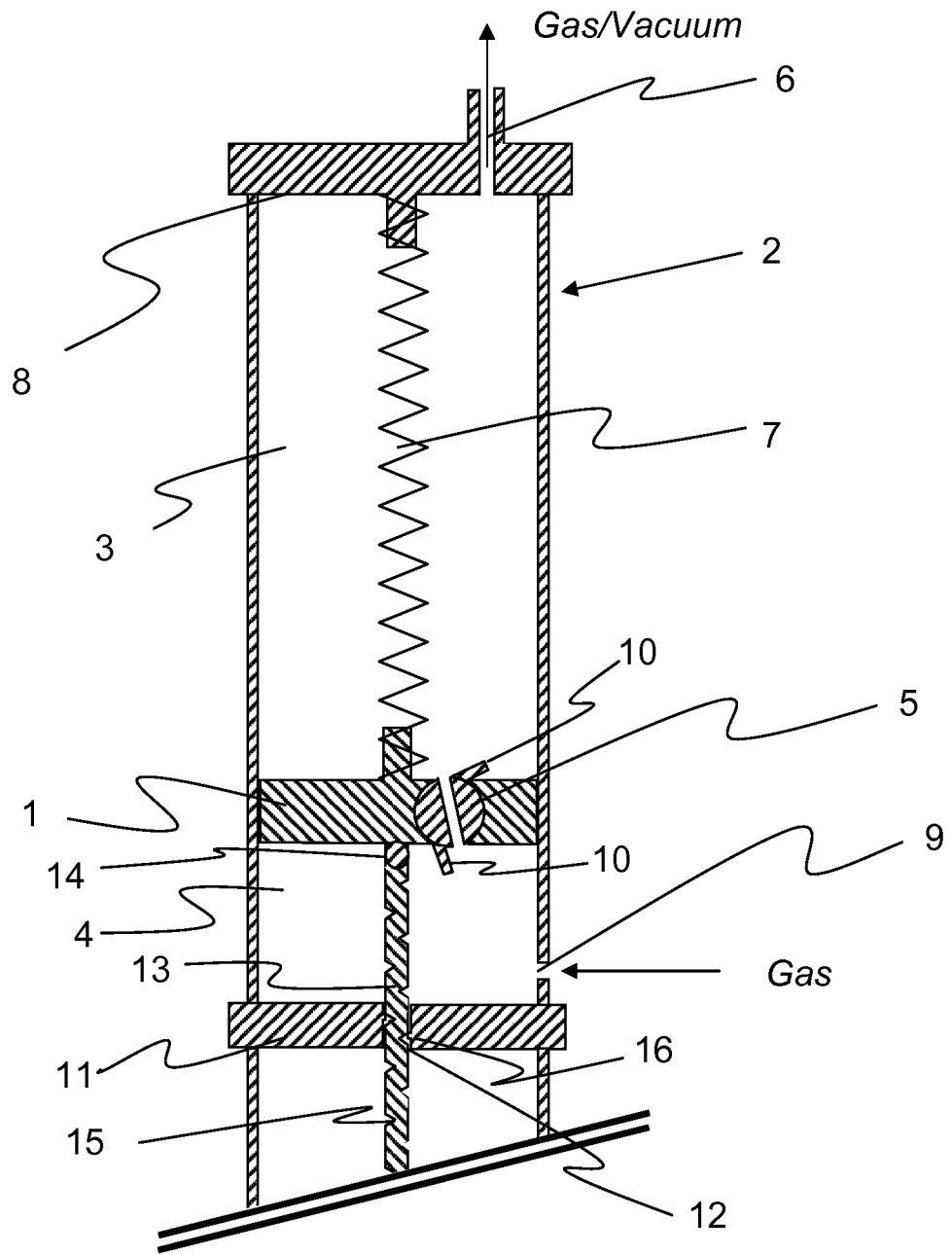

| | | | |
|---|---|---|---|
| 3,254,640 A * | 6/1966 | Sprouse | 124/16 |
| 3,417,971 A | 12/1968 | Blank et al. | |
| 3,476,016 A * | 11/1969 | Dixon et al. | 91/520 |
| 3,496,986 A * | 2/1970 | Nyc | 152/418 |
| 3,738,535 A | 6/1973 | Nicholls | |
| 3,986,439 A * | 10/1976 | Ring | 92/158 |
| 4,671,263 A | 6/1987 | Draenert | |
| 4,758,096 A | 7/1988 | Gunnarsson | |
| 4,822,269 A * | 4/1989 | Kamiyama et al. | 425/203 |
| 4,825,752 A * | 5/1989 | Kiffmeyer | 91/422 |
| 4,949,622 A * | 8/1990 | Brooks | 91/224 |
| 4,973,168 A | 11/1990 | Chan | |
| 5,031,664 A * | 7/1991 | Alaze | 138/31 |
| 5,100,241 A | 3/1992 | Chan | |
| 5,344,232 A | 9/1994 | Nelson et al. | |
| 5,551,778 A | 9/1996 | Hauke et al. | |
| 5,586,821 A | 12/1996 | Bonitati et al. | |
| 5,588,745 A | 12/1996 | Tanaka et al. | |
| 5,624,184 A | 4/1997 | Chan | |
| 5,624,186 A | 4/1997 | Ogier | |
| 5,677,483 A * | 10/1997 | Tam | 73/146.8 |
| 5,842,785 A | 12/1998 | Brown et al. | |
| 5,997,544 A | 12/1999 | Nies et al. | |
| 6,033,105 A | 3/2000 | Barker et al. | |
| 6,592,247 B1 | 7/2003 | Brown et al. | |
| 6,709,149 B1 | 3/2004 | Tepic | |
| 6,984,063 B2 * | 1/2006 | Barker et al. | 366/139 |
| 7,650,829 B2 * | 1/2010 | Beck | 92/181 R |
| 2003/0155381 A1 | 8/2003 | Chan | |
| 2007/0211565 A1 * | 9/2007 | Plishka et al. | 366/189 |
| 2008/0093574 A1 * | 4/2008 | Ohta | 251/315.1 |
| 2010/0329074 A1 | 12/2010 | Vogt et al. | |
| 2011/0079142 A1 * | 4/2011 | Albrecht et al. | 92/181 R |
| 2011/0160737 A1 * | 6/2011 | Steffen et al. | 606/94 |
| 2011/0272433 A1 * | 11/2011 | Vogt et al. | 222/137 |
| 2011/0272437 A1 * | 11/2011 | Vogt et al. | 222/389 |
| 2011/0272438 A1 * | 11/2011 | Vogt et al. | 222/389 |

FOREIGN PATENT DOCUMENTS

| | | |
|---|---|---|
| DE | 10 2009 031 178 | 9/2010 |
| EP | 0 692 229 A1 | 1/1996 |
| EP | 1 005 901 A2 | 6/2000 |
| EP | 1 016 452 A2 | 7/2000 |
| EP | 1 020 167 A2 | 7/2000 |
| EP | 1 920 738 A2 | 5/2008 |
| GB | 912237 | 12/1962 |
| GB | 1300093 | 12/1972 |
| JP | S53-23782 | 3/1978 |
| JP | 2002052331 A | 2/2002 |
| JP | 2011005255 A | 1/2011 |
| JP | 2011025043 A | 2/2011 |
| SU | 960022 A2 | 9/1982 |
| WO | 94 26403 A1 | 11/1994 |
| WO | 99 42205 A1 | 8/1999 |
| WO | 99 67015 A1 | 12/1999 |

OTHER PUBLICATIONS

Breusch et al., "Der Stand der Zementiertechnik in Deutschland," Z. Orthop, 137; pp. 101-107 1999, English language abstract in right column on pp. 101.

Charnley, "Anchorage of the femoral head prosthesis of the shaft of the femur," J. Bone Joint Surg. 42; pp. 28-30; 1960.

English-Language Translation of Japanese Office Action for corresponding Japanese Patent Application No. 2012-256016 dated Dec. 3, 2013.

Non-Final Rejection from related U.S. Appl. No. 13/679,562, mailed Feb. 11, 2015.

* cited by examiner

DEVICE FOR MIXING BONE CEMENT AND METHOD FOR MIXING BONE CEMENT AND USE OF THE DEVICE

The invention relates to a device for mixing bone cement, in particular PMMA bone cement (polymethylmethacrylate bone cement).

Conventional PMMA bone cements have been known for decades and are based on the ground-breaking work of Sir Charnley (Charnley, J.: Anchorage of the femoral head prosthesis of the shaft of the femur. J. Bone Joint Surg. 42 (1960) 28-30). The basic structure of PMMA bone cements has remained the same ever since. PMMA bone cements consist of a liquid monomer component and a powder component. The monomer component generally contains the monomer, methylmethacrylate, and an activator (N,N-dimethyl-p-toluidine) dissolved therein. The powder component consists of one or more polymers that are made by polymerisation, preferably suspension polymerisation, based on methylmethacrylate and co-monomers, such as styrene, methylacrylate or similar monomers, a radio-opaquer, and the initiator, dibenzoylperoxide. Mixing the powder component and the monomer component, a dough that can be shaped plastically is generated by swelling of the polymers of the powder component in the methylmethacrylate. When the powder component and the monomer component are being mixed, the activator, N,N-dimethyl-p-toluidine, reacts with dibenzoylperoxide which disintegrates while forming radicals. The radicals thus formed trigger the radical polymerisation of the methylmethacrylate. Upon advancing polymerisation of the methylmethacrylate, the viscosity of the cement dough increases until the cement dough solidifies and thus is cured.

Polymethylmethacrylate bone cements can be mixed by mixing the cement powder and the monomer liquid in suitable mixing beakers with the aid of spatulas. This procedure is disadvantageous in that air inclusions may be present in the cement dough thus formed and cause destabilisation of the bone cement later on. For this reason, it is preferred to mix bone cement powder and monomer liquid in vacuum mixing systems, since mixing in a vacuum removes air inclusions from the cement dough to a large extent and thus achieves optimal cement quality (Breusch, S. J. et al.: Der Stand der Zementiertechnik in Deutschland, Z. Orthop. 1999, 137: 101-07). Bone cements mixed in a vacuum have clearly reduced porosity and thus show improved mechanical properties. A large number of vacuum cementing systems has been disclosed of which the following shall be listed for exemplary purposes: U.S. Pat. No. 4,671,263, U.S. Pat. No. 5,624,186, U.S. Pat. No. 6,033,105, EP 0 692 229 A1, EP 1 005 901 A2, EP 1 020 167 A2.

Vacuum cementing systems are a refinement, in which both the cement powder and the monomer liquid are already pre-packaged in separate compartments of the mixing systems and are mixed with each other only right before application of the cement in the cementing system (U.S. Pat. No. 5,997,544, EP 0 692 229 A1, U.S. Pat. No. 6,709,149).

With the exception of mixing systems driven through electrical motors, the cementing systems currently in use mix the liquid cement component and the powder-shaped component through manual actuation of a mixing rod that has a mixing organ, such as mixing wheels or mixing vanes. The mixing result of manually driven mixing depends strongly on how the individual person performs the mixing process. The force used by the person, the number of vertical mixing motions, the angle of rotation of the mixing motions, the maximal deflection of the mixing organ in the direction of the cartridge head and cartridge floor, and the overall mixing time affect the mixing result with regard to the homogeneity of the cement dough. The cement quality can therefore vary strongly between different medical users. It would therefore be desirable to have a reproducible production of a homogeneous cement dough, whereby the cement quality should be absolutely independent of the individual medical user in order for an optimal cementing result to be made possible.

The invention is based on the object to develop a device that is as simple as possible and can be used to produce bone cement dough reliably and of reproducible quality through homogeneous mixing of a liquid bone cement component and a powder-shaped bone cement component.

This object is met by claim 1. The scope of the invention comprises a device for automatic mixing of bone cement having a plunger in a plunger space that subdivides the plunger space into a first plunger space section and a second plunger space section and comprises a blocking organ which is being switched at the plunger turnaround points. The device further comprises a gas outlet in the first plunger space section, an elastically restoring structural element, such as, for example, a spring element, that is arranged between the plunger and the wall of the first plunger space section opposite from the plunger, a gas feed in the second plunger space section, and a mixing facility that is connected to the plunger.

The invention is based on the rationale to move a plunger in a plunger space through negative or over-pressure, a vacuum or compressed gas, whereby the plunger space is connected to a cartridge closure. The plunger is connected to an axially mobile rod by means of a rotary joint in positive fit- or non-positive fit-like manner such that the rod can perform a motion about an axis independent of a rotation of the plunger. The plunger contains a blocking organ having a gas-permeable passage that connects the space above the plunger to the space below the plunger. In the closed state, the blocking organ closes said passage in gas-tight manner. The blocking organ is switched from the closed to the open state at a turnaround point of the plunger, and is switched from the open to the closed state at the other turnaround point. A vacuum or compressed gas is used to make the plunger move such that it moves back and forth in the plunger space and thus makes the rod perform a rotary motion. A mixing organ provided at the rod mixes the bone cement.

Preferably, the plunger space is a hollow cylinder whose ends are closed in gas-tight manner. A plunger that is mobile along the cylinder axis and touches against the lateral walls of the plunger space in a gas-tight manner is arranged in the plunger space.

The blocking organ arranged in the plunger comprises at least one passage, which, in the open position, connects the first plunger space section on one side of the plunger and the second plunger space section on the other side of the plunger in a gas-permeable manner and, in the closed position, separates the two plunger space sections from each other in a gas-tight manner.

Preferably, the cross-section of the passage in the blocking organ is larger than the cross-section of the gas outlet. It is also preferred that the cross-section of the passage in the blocking organ is larger than the cross-section of the gas feed. This ensures that complete pressure equalisation with the surrounding atmosphere occurs until the blocking organ is switched at the plunger turnaround points.

Preferably, the blocking organ is a rotary valve. Particularly preferably, the rotary valve is controlled through two pins that are attached at the external circumference of the rotary valve and are arranged at an angle of <180° with respect to each other originating from the rotation axis of the rotary valve. The rotary valve is switched from the open to the closed position and vice versa by the pin being made to hit against a wall of the plunger space as a result of the plunger motion. In the process, the pin is pressed against the plunger and the rotary valve rotates about its axis and switches from the open state to the closed state or vice versa.

Other options are conceivable as well. Accordingly, a shiftable closure, such as, for example, a hollow cylinder that is closed on one side and has lateral openings, can be shifted to an open and closed position when it hits the walls of the plunger space.

The plunger subdivides the plunger space into two plunger space sections. One plunger space section is provided with a gas outlet, whereas the other plunger space section comprises a gas feed.

A rotary joint connects the plunger to a rod, which has a mixing facility attached to it. The rod can extend through the plunger space section comprising the gas feed. However, it can just as well extend through the plunger space section having the gas outlet.

Preferably, the gas outlet is situated in the vicinity of the front wall of the plunger space. If the mixing facility extends through the chamber to which the compressed gas is connected, it is particularly preferred for the gas outlet to be recessed into the front wall.

Likewise, the gas feed is preferably also situated in the vicinity of the front wall of the plunger space. If the mixing facility extends through the chamber to which the vacuum is connected, it is particularly preferred for the gas feed to be recessed into the front wall.

An elastically restoring structural element is arranged between the plunger and the wall opposite from the plunger in the plunger space section having the gas outlet. Preferably, the elastically restoring structural element is a spring element, preferably a coil spring.

In the closed state of the blocking organ, the plunger moves as a result of the forces exerted on the plunger through the over- or negative pressure. This means that the first plunger space section decreases in size, i.e. the plunger space section having the gas outlet decreases in size. When the plunger hits against the opposite wall of the first plunger space section, the blocking organ is switched to the open state and the pressure can be equalised. The restoring force of the elastically restoring structural element moves the plunger in the opposite direction. In the process, the second plunger space section, i.e. the plunger section having the gas feed, decreases in size. The plunger hits against the opposite wall and the blocking organ is closed again. This process is repeated for as long as gas is being discharged or supplied.

This process is effected through alternating build-up of a pressure difference and pressure equalisation in both plunger space sections. The pressure difference is of crucial importance in this context, whereas it is insignificant if the overpressure is being applied on the side of the gas feed or if a negative pressure is being applied on the side of the gas outlet. It is preferred to apply a negative pressure on the side of the gas outlet, since a vacuum, which also serves to degas the bone cement, is already present there.

The plunger is connected to a mixing facility through a connecting element, such as, for example, a rod. Preferably, the rod can be rotated, for example through a rotary joint, such as a torsion joint or ball joint. The rod can be provided, for example, with a steep thread that is engaged by a peg.

The rod extends through a cartridge closure that possesses an opening having a diameter that corresponds to the external diameter of the rod. The rod is arranged in this opening such as to be axially mobile.

Preferably, the rod has at least one steep thread that is engaged by a peg that is arranged in the opening of the cartridge closure such as to be immobile. The connected rod moves along during the axial plunger motion. Concurrently, the rod is made to rotate about its axis by means of the immobile peg engaging the thread. As a result, the mixing facility arranged at the end of the rod also performs a linear, axial motion and a rotary motion simultaneously. The bone cement is mixed through these combined motions.

The rod should be sufficiently long for the mixing organ to touch the cartridge floor such that the bone cement at the cartridge floor is also being mixed. Preferably, the rod can be moved in the plunger in the direction of the closed end to a sufficient extent for the upper side of the mixing organ to touch against the underside of the cartridge closure. As a result, even residual cement at the underside of the cartridge closure can be wiped off safely by the mixing organ. It is advantageous for the mixing organ to touch against the internal side of the cartridge by means of its external edge.

According to the invention, the mixing is effected, without any manual force acting, through a vacuum-driven or pressure-driven drive unit. Cementing systems that are currently common in the market contain vacuum pumps that generate a vacuum of up to 100-150 mbar. The device according to the invention can utilise said vacuum of approximately 150 mbar for propelling.

The device is used for mixing polymethylmethacrylate bone cements and inorganic bone cements containing calcium phosphate and/or calcium sulfate as their main components. This relates mainly to calcium phosphate cements based on amorphous calcium phosphate, α-tricalcium phosphate, β-tricalcium phosphate, tetracalcium phosphate, brushite, monetite, and octacalcium phosphate as well as mixtures thereof. Calcium sulfate bone cements are based on calcium sulfate hemihydrate.

Figure 2:
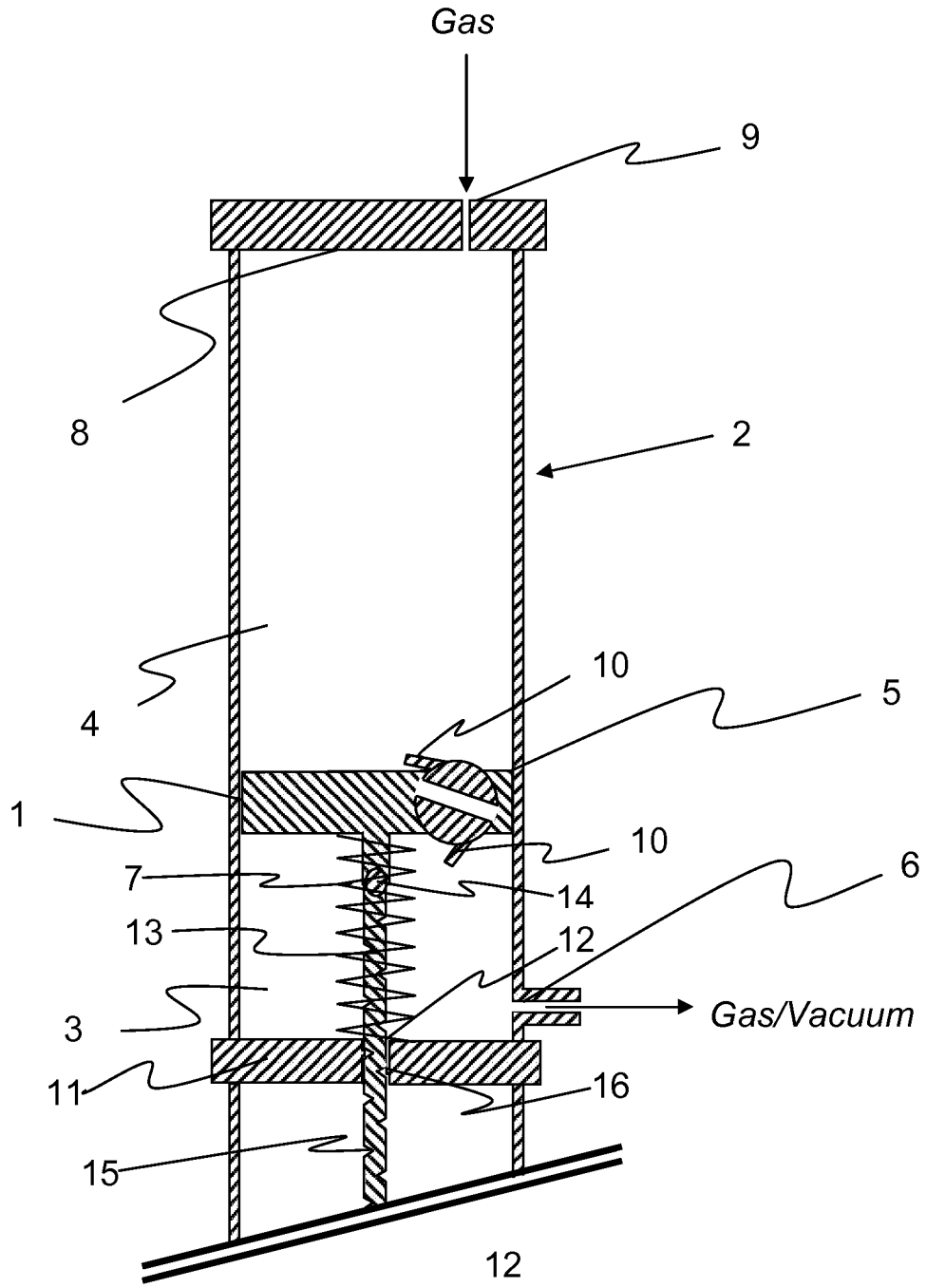

The invention shall be illustrated in the following in exemplary fashion based on the appended drawings. In the figures:

FIG. 1 shows a sectional view of a detail of a first embodiment of the invention; and FIG. 2 shows a sectional view of a detail of a second embodiment of the invention.

FIG. 1 shows a drive for a mixing facility that contains a hollow cylinder with a plunger space 2. A plunger 1 is arranged in said hollow cylinder and is moved through a vacuum or compressed gas. The plunger subdivides the plunger space 2 into two plunger space sections 3,4. The first plunger space section 3 comprises a gas outlet 6.

Said plunger 1 has a rotary valve 5 arranged in it, which, in the open state, connects the two plunger space sections 3,4 to each other. In the closed state, the two plunger space sections 3,4 are separated from each other in a gas-tight manner. A spring element 7 is arranged between the internal wall 8 of the hollow cylinder cap and the plunger 1 and, in the relaxed state, presses the plunger against the wall of the second plunger space section 4 opposite from the plunger.

A pressure difference between the two plunger space sections 3 and 4 is built-up if a vacuum is then applied to the first plunger space section and the rotary valve is in the closed state. The pressure applied to the second plunger space section 4 is higher than that applied to the first plunger space section 3. Said pressure difference moves the plunger 1 against the force of the spring element 7 towards the opposite wall 8 of the first plunger space section. When the pin 10 hits against the wall 8, it is being pressed against the plunger 1 and the rotary valve 5 moves to the open position. This results in the pressure being equalised between the two plunger space section 3 and 4. The overpressure in the second plunger space section is removed and the plunger 1 moves in the direction of the cartridge (downwards in the drawing) by means of the restoring force of the spring element 7. In this place, the second pin hits against the other wall of the second plunger space section 4 that is opposite from the plunger. As a result, the rotary valve 5 is switched again, this time into the closed position. With the rotary valve 5 closed, a pressure difference can be built-up again which then moves the plunger 1 upward again. This process is repeated for as long as a vacuum is applied.

The up-and-down motion causes a rod 13, which is attached to the plunger 1 by means of a rotary joint 14, to also be moved up and down. The rod 13 has a thread 15 recessed into it that is being engaged by pegs 16 that are arranged in an opening 12 of the cartridge cover 11. The up-and-down motion of the rod 13 and the thread 15 engaging the pegs 16 make the rod rotate simultaneously.

Accordingly, a mixing facility attached to the rod 13 (not shown), which also moves up-and-down and stirs simultaneously, can mix bone cement efficiently.

A drive facility of said type can just as well be driven by gas over-pressure rather than a vacuum. In this case, an over-pressure is applied by means of the gas connection 9, whereas the gas pressure at the gas outlet 6 is normal. With the valve closed, the plunger 1 moves upwards (see FIG. 1). The working principle of said drive is exactly the same as the one discussed above.

FIG. 2 also shows a drive for a mixing facility that contains a hollow cylinder with a plunger space 2. As before, said plunger 1 can be moved by means of a vacuum or compressed gas and subdivides the plunger space 2 into a first plunger space section 3 and a second plunger space section 4. The first plunger space section 3, which is arranged below the second plunger space section 4 in this figure, comprises a gas outlet 6.

Said plunger 1 has a rotary valve 5 arranged in it, which, in the open state, connects the two plunger space sections 3, 4 to each other. In the closed state, the two plunger space sections 3, 4 are separated from each other in a gas-tight manner.

A spring element 7 is arranged in the first plunger space section 3 between the plunger 1 and the cartridge cover 11. In the relaxed state, said spring element 7 presses the plunger 1 against the wall 8 of the second plunger space section 4 that is opposite from the plunger 1.

A pressure difference between the two plunger space sections 3 and 4 is built-up if a vacuum is then applied to the first plunger space section 3 and the rotary valve 5 is in the closed state. The pressure applied to the second plunger space section 4 is higher than that applied to the first plunger space section 3. Said pressure difference moves the plunger 1 against the force of the spring element 7 towards the cartridge cover 11. When the pin 10 hits against the cartridge cover 11, it is being moved towards the plunger 1 and the rotary valve 5 moves to the open position. This results in the pressure being equalised between the two plunger space section 3 and 4. The over-pressure in the second plunger space section 4 is removed and the plunger 1 moves in the direction of the wall 8 (upwards in the drawing) by means of the restoring force of the spring element 7. In this place, the second pin hits against the wall 8 of the second plunger space section 4. As a result, the rotary valve 5 is switched again, this time into the closed position. With the rotary valve 5 closed, a pressure difference can be built-up again that moves the plunger 1 downwards again. This process is repeated for as long as a vacuum is applied.

The up-and-down motion causes a rod 13, which is attached to the plunger 1 by means of a rotary joint 14, to also be moved up and down. The rod 13 has a thread 15 recessed into it that is being engaged by pegs 16 that are arranged in an opening 12 of the cartridge cover 11. The up-and-down motion of the rod 13 and the thread 15 engaging the pegs 16 make the rod rotate simultaneously.

Accordingly, a mixing facility (not shown) attached to the rod 13, which also moves up-and-down and simultaneously stirs, can mix bone cement efficiently.

This drive facility can also be driven just as well by gas over-pressure rather than a vacuum. In this case, an over-pressure is applied by means of the gas connection 9, whereas the gas pressure at the gas outlet 6 is normal. With the valve closed, the plunger 1 moves downwards (see FIG. 2).

LIST OF REFERENCE NUMBERS

1 Plunger
2 Plunger space
3 First plunger space section
4 Second plunger space section
5 Blocking organ, rotary valve
6 Gas outlet
7 Elastically restoring element, spring element
8 Wall
9 Gas feed
10 Pins
11 Cartridge cover
12 Opening
13 Rod
14 Rotary joint
15 Thread
16 Peg

We claim:

1. A device for automatic mixing of bone cement, the device comprises:
a hollow cylinder having an interior space and a length defined between a first wall and a second wall;
a plunger arranged within the interior space, wherein the plunger subdivides the interior space into a first plunger space section and a second plunger space section, wherein the plunger has a length defined between a first side and a second side, wherein the first side of the plunger is located adjacent to the first wall of the hollow cylinder and the second side of the plunger is located adjacent to the second wall of the hollow cylinder;
a blocking organ extending through the plunger from the first side of the plunger to the second side of the plunger, wherein the blocking organ is switchable at a turnaround point of the plunger, and that, in an open state, the blocking organ connects the first plunger space section to the second plunger space section, and, in a closed state, the blocking organ separates the first and second plunger space sections in a gas-tight manner, wherein the blocking organ comprises a first pin and a second pin that control the blocking organ, wherein the first pin extends away from the first side of the plunger at an angle with respect to the first side of the plunger into the first plunger space section and the second pin extends away from the second side of the plunger at an angle with respect to the second side of the plunger into the second plunger space section;
a gas outlet in the first plunger space section;
an elastically restoring structural element arranged between the plunger and the first wall of the device, wherein the elastically restoring structural element, in its entirety, is located between the first side of the plunger and the first wall of the hollow cylinder and maintained within the first plunger space; and a gas feed in the second plunger space section.

2. The device according to claim 1, wherein a vacuum is applied at the gas outlet.

3. The device according to claim 1, wherein compressed gas is supplied through the gas feed.

4. The device according to claim 1, wherein the blocking organ is a rotary valve.

5. The device according to claim 4, wherein the first and second pins are attached on the external circumference of the rotary valve and arranged at an angle of <180° with respect to each other originating from the rotation axis of the rotary valve.

6. The device according to claim 1, further comprising:

a connecting element extending from the plunger into the second plunger space section.

7. The device according to claim 1, further comprising:

a connecting element extending from the plunger into the first plunger space section.

8. The device according to claim 6, wherein the connecting element is a rod having a thread that is connected to the plunger by means of a rotary joint, whereby the thread is engaged by stationary pegs.

9. The device according to claim 1, wherein a cross-section of a passage in the blocking organ is larger than a cross-section of the gas outlet.

10. The device according to claim 1, wherein a cross-section of a passage in the blocking organ is larger than a cross-section of the gas feed.

11. The device according to claim 7, wherein the connecting element is a rod having a thread that is connected to the plunger by means of a rotary joint, whereby the thread is engaged by stationary pegs.

12. The device according to claim 1, wherein an end of the elastically restoring structural element contacting the first wall of the hollow cylinder and an entrance to the gas outlet are substantially coplanar.

13. The device according to claim 1, wherein the elastically restoring structural element comprises a spring element that, in a relaxed state, presses the plunger against the second wall of the hollow cylinder.

* * * * *